United States Patent [19]
Piatkowski, Jr.

[11] 3,980,933
[45] Sept. 14, 1976

[54] CONTROL CIRCUIT FOR VARIABLE RELUCTANCE MOTOR

[75] Inventor: Philip Piatkowski, Jr., Fraser, Mich.

[73] Assignee: Ford Motor Company, Dearborn, Mich.

[22] Filed: Dec. 19, 1974

[21] Appl. No.: 534,514

[52] U.S. Cl. .............................. 318/138; 318/166; 318/331
[51] Int. Cl.² ...................................... H02K 29/00
[58] Field of Search ............ 318/138, 166, 254, 331

[56] References Cited
UNITED STATES PATENTS

| | | | |
|---|---|---|---|
| 3,304,481 | 2/1967 | Saussele | 318/138 |
| 3,611,081 | 10/1971 | Watson | 318/138 |
| 3,775,648 | 11/1973 | Brown et al. | 318/138 |
| 3,906,320 | 9/1975 | Doemen | 318/331 |

Primary Examiner—Gene Z. Rubinson
Attorney, Agent, or Firm—Robert W. Brown; Keith L. Zerschling

[57] ABSTRACT

A control circuit for a variable reluctance motor. A solid state switching device has its output circuit connected in series with the electrical winding of the motor. Circuit means are coupled to the motor winding and to the control electrode of the solid state switching device. The circuit means senses the EMF induced in the motor winding while the motor is rotating and while the switching device output is nonconductive. The switching device output circuit is rendered conductive when the EMF attains a predetermined level. The EMF induced in the winding of the rotating motor results from residual magnetism in the magnetic circuit of the motor or from such residual magnetism in addition to a bias current supplied to the motor winding. The variable reluctance motor acts as its own position sensor.

13 Claims, 2 Drawing Figures

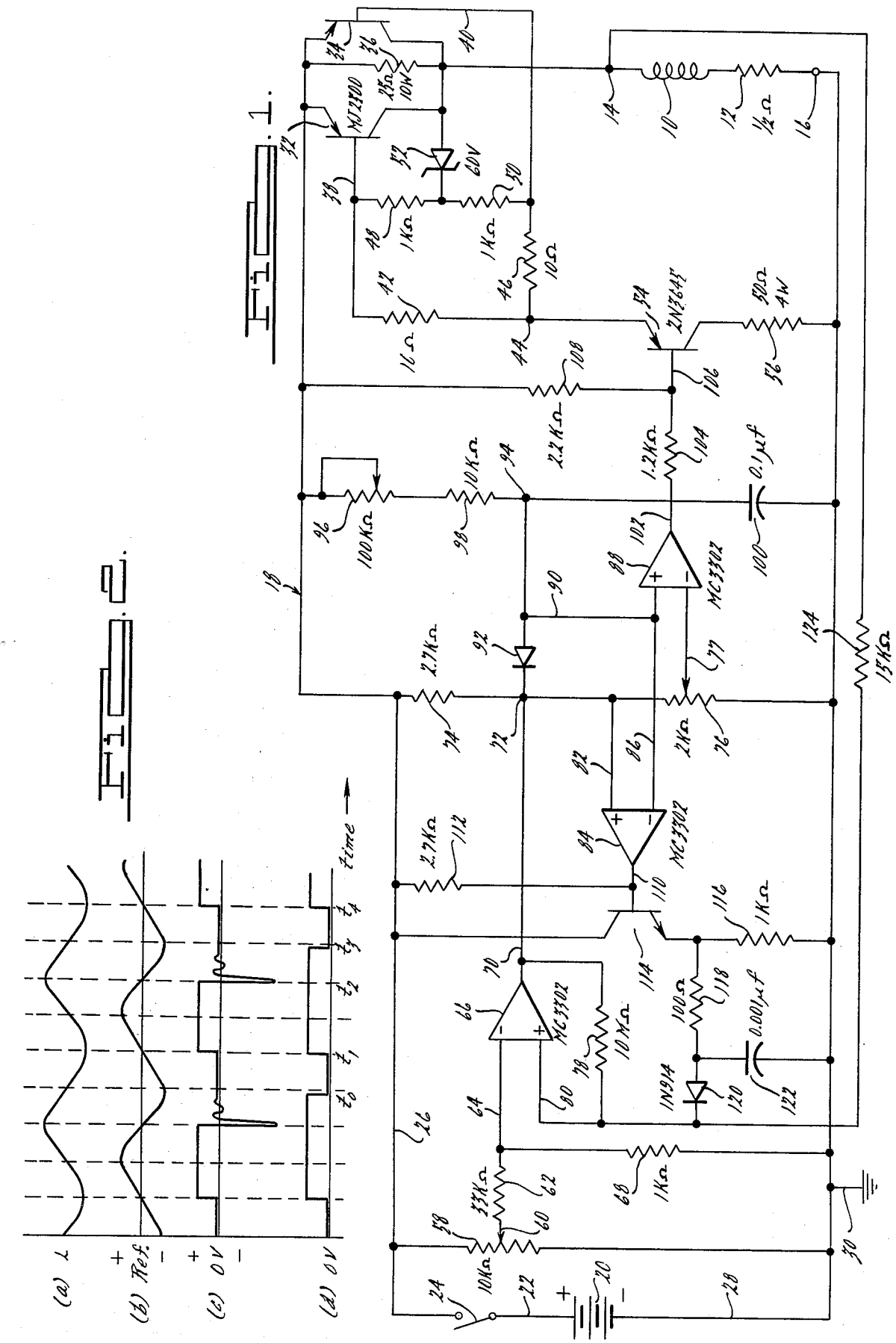

CONTROL CIRCUIT FOR VARIABLE RELUCTANCE MOTOR

BACKGROUND

This invention relates to a control circuit for a variable reluctance motor. More particularly, it relates to a control circuit which utilizes an EMF induced in the winding of a variable reluctance motor to provide information concerning the position of the rotor to permit ampere-turns to be supplied to the motor winding during intervals of increasing magnetic permeance in its magnetic circuit, thereby, to produce motoring torque and continuous motor rotation.

Variable reluctance motors are well-known in the prior art and various exemplary designs of such motors may be seen in U.S. Pat. Nos. 3,700,943 to Heintz; 3,700,944 to Heintz et al; 3,714,533 to Unnewehr; and 3,401,288 to French. These brushless motors employ an exciting winding and a magentic circuit to produce mechanical torque which is substantially proportional to the square of the winding ampere-turns and to the time rate of change of permeance (reciprocal of reluctance), which is a function of the displacement of the rotor in the motor. Typically, these motors employ a stator containing a motor winding and a rotor containing ferro-magnetic elements spaced from one another. Displacement of the rotor relative to the stator produces a variation in reluctance, and, hence, permeance of the magnetic circuit of the motor winding. Of course, displacement of the rotor relative to the stator also produces a variation in the self-inductance of the motor winding, this self-inductance being directly related to the permeance of the magnetic circuit.

The torque or force produced by a variable reluctance motor is proportional to the product of the square of the winding ampere-turns and the rate of change of permeance as a function of rotor displacement. From the preceding, it is apparent that motor torque or force that is positive with respect to some arbitrary reference can only be developed when winding ampere-turns are sustained during an interval in which the permeance increases with rotor displacement. Conversely, negative motor torque or force is developed when winding ampere-turns are sustained during an interval in which the permeance decreases with rotor displacement. Thus, in order to secure continuous rotation of the variable reluctance motor, it is necessary to apply ampere-turns to the motor winding during intervals of increasing permeance and to decrease or eliminate such ampere-turns during intervals of decreasing permeance.

From the above discussion, it is apparent that the winding of a variable reluctance motor must be excited from a time varying source. Furthermore, the time variations of the source must be synchronized with the mechanical rotation of the machine rotor so that winding current is supplied to the motor during intervals in which the permeance increases with displacement and so that such current is interrupted during the intervals in which the permeance is decreasing with displacement. When a timeinvariant source of electrical energy, such as a direct current source, is used, a controller is required to produce synchronized pulsations of winding ampere-turns.

Control circuits for variable reluctance motors in the past have utilized an external position sensor to determine the onset of each of the intervals of increasing magnetic permeance. In U.S. Pat. No. 3,673,476 to D. R. Hamburg, a signal producing apparatus for use with a three-phase variable reluctance motor is described in detail. French Pat. No. 3,401,288 mentioned above, also discloses a position sensing apparatus for a variable reluctance motor. U.S. Pat. Nos. 3,321,685 to Johannes and 3,466,519 to Platnick also disclose position sensing apparatus for use with motors, although the motors are not of the variable reluctance type.

SUMMARY OF THE INVENTION

The present invention improves over the prior art in that it provides a control circuit for a variable reluctance motor which utilizes an EMF induced in the motor winding in order to provide position sensing information so that ampere-turns may be supplied to the motor winding during intervals of increasing magnetic permeance in the magnetic circuit of the motor. The EMF induced in the motor winding is the result of residual magnetism in its magnetic circuit or is the result of such residual magnetism, if any, in addition to that produced by a bias current supplied to the motor winding. The residual magnetism is the magnetic field which exists in the magnetic circuit of the motor in the absence of current flow through the motor winding. The bias current may be supplied to the motor winding continuously through an impedance element. The main motor winding current is controlled by the output circuit of a solid state switching device. The solid switching device directly couples the motor winding to a source of electrical energy during intervals of increasing permeance in the magnetic circuit of the motor. During intervals of decreasing magnetic permeance only the bias current flows through the motor winding and the EMF induced in the motor winding during motor rotation with this bias current present is sensed and, when the induced EMF attains or crosses a predetermined level, this provides an indication of the onset of an interval of increasing magnetic permeance and the solid state switching device is placed in a state of conductivity which directly couples the motor winding to the source of electrical energy. Thus, the motor winding acts as its own position sensor.

The invention may be better understood by reference to the detailed description which follows and to the drawings.

BRIEF DESCRIPTION OF THE DRAWINGS

FIG. 1 is a schematic electrical diagram of a control circuit for variable reluctance motor; and FIG. 2 consists of four time-varying waveforms pertinent to the circuit of FIG. 1; the waveforms are identified by the letters $a$ through $d$ and hereinafter are referred to as waveform $2(a)$, $2(b)$, etc.

DETAILED DESCRIPTION

With reference now to the drawings and in particular to FIG. 1, there is shown a variable reluctance motor winding 10 having an internal resistance 12. The terminals 14 and 16 of the motor winding are coupled to a control circuit for the variable reluctance motor, this control circuit being generally designated by the numeral 18. The control circuit 18 controls the application of electrical energy from a DC source 20, which may be a conventional twelve-volt storage battery or the equivalent, to the motor winding 10. The positive lead 22 of the DC source is connected through switch 24 to a positive voltage supply lead 26 of the control circuit 18. The negative lead 28 from the DC source 20 is connected to ground at 30 and forms the negative voltage supply lead for the control circuit 18 and the motor winding 10.

The control circuit 18 is particularly intended, and has its component values and circuit element types selected, for use in conjunction with a variable reluctance motor pump of the kind described in U.S. Pat. application Ser. No. 534,512, now U.S. Pat. No. 3,932,069 filed Dec. 19, 1974 in the names of D. Giardini and L. E. Unnewehr entitled "Variable Reluctance Motor Pump" and assigned to the assignee of the present invention. Of course, the control circuit of the invention may be used with other variable reluctance motors of single or multi-phase configuration and various modifications of the circuit 18 may be made to accomodate the exigencies of the applications.

In the specific circuit shown in FIG. 1, a pair of identical transistors 32 and 34 have their emitter-collector output circuits connected in parallel with one another and coupled to the motor winding 10 to control the flow of current from the positive supply lead 18, through the motor winding 10, to the ground lead 28. Thus, the parallel-connected emitter-collector output circuits of the transistors 32 and 34 are connected in series with the motor winding 10. A resistor 36 is connected in parallel with the output circuits of the transistors 32 and 34 and also is connected in series with the motor winding 10. A bias current flows continuously through the resistor 36 and through the motor winding 10 to the ground lead 28 as long as the switch 24 is closed. The internal resistance 12 of the motor winding 10 may, for example, be about one-half ohm and, therefore, a current of approximately one-half ampere flows through the motor winding 10 with the resistance 36 being of the value indicated and with a twelve-volt DC source 20. Of course, when the emitter-collector output circuits of the transistors 32 and 34 are conductive, the resistor 36 is shunted and the current through the motor winding 10 is considerably larger and of a magnitude determined by the impedance of the motor winding 10.

With the output circuits of the transistors 32 and 34 nonconductive and with the rotor of the variable reluctance motor rotating, the terminal 14 of the winding 10 has a time varying voltage with a DC component. If the bias current flowing through the winding 10 is one-half ampere, terminal 14 has a DC voltage component of about 250 millivolts with an AC waveform in the millivolt range superimposed upon it as a result of the EMF induced in the motor winding 10 during rotation of the motor rotor with the bias current flowing through the winding 10. FIG. 2(b) depicts this induced alternating EMF which is superimposed on the reference level of about 250 millivolts above ground potential.

It should be noted that the transistors 32 and 34 supply unidirectional current to the motor winding 10 and, therefore, the magnetic circuit of the variable reluctance motor associated with this writing possesses residual magnetism when the transistors are nonconductive, This occurs even in the absence of the bias current feed resistor 36. Thus, even if the bias current were not present, an EMF would be induced in the motor winding 10 while the rotor of the motor is rotating with the transistors 32 and 34 nonconductive. However, the presence of the bias current feed resistor 36 adds to the EMF induced in the motor winding 10 when the transistor output circuits are nonconductive.

The control circuit of the invention senses the induced millivoltage at the motor terminal 14, when the output circuits of the transistors 32 and 34 are nonconductive, to provide position sensing information with respect to the rotor of the variable reluctance motor so that the output circuits of the transistors 32 and 34 may be rendered conductive to directly couple the motor winding 10 to the positive voltage supply lead 26 during intervals of increasing permeance in the magnetic circuit of the variable reluctance motor. Waveform 2(a) illustrates the time variation of the inductance of a variable reluctance motor of the type illustrated in U.S. Pat. No. 3,932,069 previously mentioned. The magnetic circuit inductance L and permeance varies cyclically as the rotor of the variable reluctance motor rotates. Between times $t_1$ and $t_2$, the permeance of the motor magnetic circuit is increasing. It is desirable during this interval to render the emitter-collector output circuits of the transistors 32 and 34 conductive to supply ampere-turns to the motor winding 10 to produce motoring torque. During the time interval between times $t_2$ and $t_4$, the permeance of the motor's magnetic circuit is decreasing, and it is desirable during this interval to prevent current flow through the motor winding 10 by rendering the transistors 32 and 34 nonconductive.

In waveform 2(b) it may be noted that the reference level (DC voltage component level) on the motor winding terminal 14 is crossed in a positive-going direction by the alternating voltage waveform superimposed thereon at time $t_1$ which corresponds to the onset of the interval of increasing magnetic permeance in the magnetic circuit of the variable reluctance motor. The control circuit 18 detects this crossing of the reference level and renders the output circuits of the transistors 32 and 34 conductive for a predetermined length of time.

Waveform 2(c) shows the actual voltage across the terminals 14 and 16 of the motor winding. It should be understood that the millivoltage waveform 2(b) is superimposed on the voltage waveform 2(c). The portion of waveform 2(c) between times $t_1$ and $t_2$ has a magnitude equal to that of the DC source 20 less the voltage drop across the emitter-collector output circuits of transistors 32 and 34. At time $t_2$ when the transistors 32 and 34 are turned off, there is a sharp negative transient followed by a small decaying voltage oscillation across the motor winding 10. In the interval between times $t_0$ and $t_1$ and the corresponding interval between times $t_3$ and $t_4$, the only voltage signal across the terminals 14 and 16 of the motor winding is the induced EMF millivoltage signal of waveform 2(b). This permits detection of the positive-going zero-crossing points, at times $t_1$ and $t_4$, at which the alternating induced EMF signal crosses the reference millivoltage level.

The base or control electrodes 38 and 40, respectively, of the transistors 32 and 34 control the conduction of their emitter-collector output circuits. The base of the transistor 32 is connected through a resistor 42 to a junction 44. Similarly, the base 40 of the transistor 34 is connected through a resistor 46 to the junction 44. The resistors 42 and 46 tend to equalize the emitter-base currents of the transistors 32 and 34. The base collector junctions of the transistors 32 and 34 are protected against negative transients on the motor terminal 14 by a network including resistors 48 and 50 connected, respectively, to the bases 38 and 40 of the transistors 32 and 34. The junction of the resistors 48 and 50 is connected to the cathode of a zener diode 52 whose anode is connected to the junction formed between the collectors of transistors 32 and 34 and motor winding terminal 14.

Junction 44 is connected to the emitter of a transistor 54 whose collector is connected through a current limiting resistor 56 to the ground lead 28. Transistor 54 provides current amplification and when its emitter-collector output circuit is conductive, the emitter-collector-output circuits of the transistors 32 and 34 also are conductive.

Conduction of the transistor 54 is controlled by the portion of the control circut 18 not yet described. This circuitry includes a potentiometer 58 whose resistance is connected between the voltage supply leads 26 and 28. The movable arm 60 of the potentiometer is connected through a resistor 62 to the negative input 64 of a comparator 66. A resistor 68 is connected between the negative input 64 and the ground lead 28. Potentiometer 58 and resistors 62 and 68 form voltage dividers that produce a millivoltage on the negative input 64 which is substantially equal to the millivoltage reference level of waveform 2(b). In other words, the voltage dividers produce a voltage on the negative input 64 which balances out the DC component of the bias current EMF waveform 2(b) on terminal 14 of the motor winding 10.

The comparator 66, as well as other comparators in the circuit have an internal output transistor which is rendered nonconductive when the positive input to the comparator is more positive than its negative input and which is rendered conductive when the positive input is more negative than its negative input. The output transistor of this and the other comparators is connected through a pull-up resistor to the plus voltage supply lead 26. Thus, the output lead 70 from the comparator 66 is connected to a junction 72 of a voltage divider that includes a resistor 74, connected to the supply lead 26 and to the junction 72, and a potentiometer 76, connected between the junction 72 and the ground voltage supply lead 28. This voltage divider acts as a pull-up circuit for the output of the comparator 66 and provides a reference potential at the junction 72 when the internal output transistor in the comparator 66 is nonconductive. A feedback resistor 78 is connected between the output 70 of the comparator 66 and its positive input 80. The potentiometer 76 has a movable arm 77 on which a voltage, less than the voltage at junction 72, appears.

The positive input 82 of a comparator 84 is connected to the junction 72. The negative input 86 of the comparator 84 is connected to the positive input of a comparator 88. The negative input to the comparator 84 and the positive input to the comparator 88 are connected by a lead 90 to the anode of a blocking diode 92 whose cathode is connected to the junction 72. The anode of the diode 92 also is connected to the junction 94 of an RC timing circuit including a variable resistor 96 connected in series with a fixed resistor 98 and a timing capacitor 100. The series combination of circuit elements 96, 98 and 100 is positioned between voltage supply leads 26 and 28. The output 102 of the comparator 88 is connected through a current limiting resistor 104 to the base, or control electrode 106 of the transistor 54. Thus, the signal on the output lead 102 of the comparator 88 controls the conductivity of the transistor 54 which, in turn, controls the transistors 32 and 34 as previously described. A pull-up resistor 108 for the comparator 88 is connected between the voltage supply lead 26 and the base electrode of transistor 54.

The output lead 110 of the comparator 84 is connected through a pull-up resistor 112 to the voltage supply lead 26 and to the base or control electrode of a current amplifying transistor 114. The collector of the transistor 114 is connected to the voltage supply lead 26 and its emitter is connected through a current limiting resistor 116 to the ground lead 28. The emitter of the transistor 114 also is connected through the series combination of a resistor 118 and a blocking diode 120 to the positive input lead 80 of the comparator 66. The blocking diode 120 is polarized in the circuit so that when the transistor 114 is conductive in its collector-emitter output circuit, its emitter potential, which then is substantially equal to the potential of positive voltage supply lead 26, is applied to the positive input of the comparator 66. A capacitor 122, which provides noise filtering, has one of its terminals connected to the junction formed between the resistor 118 and the anode of the blocking diode 120 and has its other terminal connected to the ground voltage supply lead 28.

The arm 77 of the potentiometer 76 is connected to the negative input of the comparator 88 to provide a reference potential on this comparator input. This potential is less than the potential at junction 72. Also, terminal 14 of the motor winding 10 is connected through a current limiting resistor 124 to the positive input 80 of the comparator 66. Thus, the bias current EMF induced in the motor winding 10 during motor rotation is supplied to the positive input of comparator 66.

In order to understand the operation of the control circuit 18, let it be assumed that the variable reluctance motor is operating at its maximum speed. The waveforms in FIG. 2 depict conditions as they exist at maximum motor speed. At this time $t_0$, a bias current is flowing through the resistor 36 and the motor winding 10. The bias-current EMF induced in the motor winding is sensed at terminal 14 and is supplied through the resistor 124 to the positive input 80 of the comparator 66. This induced EMF is at its negative peak value with respect to the reference level indicated in FIG. 2(b). At this time, the positive input to the comparator 66 is more negative than the potential applied to the negative input of the comparator 66, which potential balances the DC component or reference level of the EMF induced in the motor winding. Therefore, the output lead 70 of the comparator 66 is at a very low voltage level corresponding to the saturation voltage of the internal output transistor in the comparator 66. As a result of this condition in the output of the comparator 66, the capacitor 100 will have been discharged to ground potential through the circuit path including the diode 92, the output lead 70 of the comparator 66, and the internal transistor in the comparator 66. Waveform 2(d) depicts the output voltage on the lead 70 of the comparator 66. This output voltage is very near ground potential between the times $t_0$ and $t_1$.

As the motor continues to rotate, the induced EMF signal on motor winding terminal 14 increases from its negative peak and crosses the reference voltage level indicated in waveform 2(b) at time $t_1$. At this reference level crossing point, the positive input 80 of the comparator 66 becomes more positive than its negative input and the internal output transistor in the comparator 66 becomes nonconductive. As a result, the output lead 70 of the comparator 66 attains the voltage level established at junction 72 by the voltage divider comprising series-connected resistances 74 and 76. This voltage level is maintained at the output of the comparator 66 for the interval between times $t_1$ and $t_3$. Feedback resistor 78 enhances the switching action of the comparator 66.

At time $t_1$ when the comparator 66 switches to cause the voltage at junction 72 to rise, the capacitor 100, having been discharged, acts as a short circuit to ground potential so that the junction 94 is at ground potential. Thus, the blocking diode 92 is reverse-biased and the ground potential at junction 94 is applied via the lead 90 to the negative input 86 of the comparator 84. Since the positive input 82 of the comparator 84 is at the increased potential at junction 72, the internal output transistor of the comparator 84 is nonconductive so that the base electrode 110 of the transistor 114 is pulled up to the potential on voltage supply lead 26 through pull-up resistor 112. This provides the base-emitter drive current for the transistor 114 and it is rendered conductive. In turn, the emitter of the transistor 114 rises to the potential on voltage supply lead 26 and this is supplied through the resistor 118 and the diode 120 to the positive input 80 of the comparator 66 latching the comparator 66 in its high output voltage condition.

Between times $t_1$ and $t_2$, the capacitor 100 is charged from the voltage supply lead 26 through the series-connected timing resistances 96 and 98. As the capacitor 100 charges, between times $t_1$ and $t_2$, the output of the comparator 88 is a low (nearly ground) potential and the transistor 54 is conductive maintaining parallel transistors 32 and 34 conductive and supplying motoring current to the winding 10 of the variable reluctance motor. At this time, the voltage across the motor winding is at the positive maximum voltage level indicated in waveform 2(c) between times $t_1$ and $t_2$.

As the capacitor 100 continues to charge, the voltage at junction 94 reaches the reference level established by the potentiometer arm 77 connected to the negative input of the comparator 88. When the voltage at junction 94 exceeds this potentiometer reference voltage by a few millivolts, the positive input to the comparator 88, which is supplied with the junction 94 voltage via lead 90, becomes more positive then the potential on its negative input and the internal output transistor of comparator 88 becomes nonconductive. This occurs at time $t_2$. The voltage of the base 106 of the transistor 54 is pulled up to the potential of voltage supply lead 26 and transistor 54 becomes nonconductive rendering the output circuits of transistors 32 and 34 nonconductive. Thus, except for the bias current flowing through the motor winding 10 via resistor 36, current through the motor winding is cut off producing the negative voltage spike indicated in waveform 2(c).

The capacitor 100 continues to charge until the voltage at junction 94 exceeds the voltage at junction 72, which occurs at time $t_3$. At this time, the voltage at junction 94 causes the negative input 86 of the comparator 84 to be more positive than the junction 72 voltage applied to its positive input 82 and, therefore, the output of the comparator 84 becomes a low potential rendering the transistor 114 nonconductive. With the transistor 114 nonconductive, the only voltage signal applied to the positive input 80 of the comparator 66 is that obtained via the motor winding terminal 14 and resistor 124, that is, the induced motor EMF signal. At time t3, this induced EMF signal is at its negative peak resulting in the output of comparator 66 going to its low saturation potential. This again provides a discharge path for the capacitor 100 through the internal output transistor of comparator 66.

In connection with the preceding discussion, it should be noted that the output voltage of the comparator 84 substantially follows waveform 2(d), but has a different maximum voltage level. Also, the output of the comparator 88 is the electrical complement of the motor voltage waveform 2(c), except that the transients shown therein are not present on the output of comparator 88. Moreover, it should be noted that the waveforms in FIG. 2 have a frequency which is directly proportional to the speed of the controlled motor. The interval between times $t_1$ and $t_2$ for waveform 2(c) is constant and not a function of motor speed because this time interval is determined by the timing circuit including resistances 96 and 98 and capacitor 100. At low motor speeds, the interval of increasing permeance in the magnetic circuit of the variable reluctance motor is much longer than the timing established by the timing circuit. Therefore, at low speeds, maximum motor current flows only for a portion of the interval of increasing permeance. As motor speed increases, the maximum current flows for an increasingly greater portion of the interval of increasing magnetic permeance until the entire interval is occupied establishing the maximum speed limit of the motor and its control circuit. Current supplied to the motor winding 10 during any portion of an interval of decreasing magnetic permeance tends to brake the motor establishing its upper speed limit. Of course, the maximum motor speed may be varied by changing the time constant of the RC timing circuit including resistances 96 and 98 capacitor 100. However, a practical limit on motor speed is established by the reactive impedance of the motor winding 10 and its associated magnetic circuit.

Based upon the foregoing description of the invention, what is claimed is:

1. A control circuit for a variable reluctance motor having an electrical winding and a magnetic circuit which retains residual magnetism in the absence of current flow through said motor winding, said control circuit comprising, in combination:
   a solid state switching device having an output circuit and a control electrode, said output circuit being coupled to said motor winding to control the flow of current therethrough; and
   circuit means, coupled to said motor winding and to said control electrode of said switching device, for sensing the EMF induced in said motor winding while said motor is rotating and said switching device output circuit is nonconductive, said EMF resulting from the presence of said residual magnetism, and for rendering said switching device output circuit in a state of conductivity causing current to flow through said motor winding when said EMF reaches a predetermined potential.

2. A control circuit according to claim 1 wherein said EMF alternates above and below a reference potential and wherein said circuit means renders said switching device output circuit in said state of conductivity to cause current to flow through said motor winding when said EMF crosses said reference potential.

3. A control circuit for a variable reluctance motor having an electrical winding, said control circuit comprising, in combination:
 a solid state switching device having an output circuit and a control electrode, said output circuit being coupled to said motor winding to control the flow of current therethrough;
 means for supplying a bias current to said motor winding regardless of the state of conductivity of said switching device output circuit; and
 circuit means, coupled to said motor winding and to said control electrode of said switching device, for sensing the EMF induced in said motor winding as a result of the flow of said bias current through said motor winding while said motor is rotating and for rendering said switching device output circuit conductive when said EMF reaches a predetermined potential.

4. A control circuit according to claim 3 wherein said EMF alternates above and below a reference potential and wherein said circuit means for sensing said EMF and for rendering said switching device output circuit conductive renders said switching device output circuit conductive when said EMF crosses said reference potential.

5. A control circuit for a variable reluctance motor having an electrical winding and a magnetic circuit associated with said motor winding, said control circuit comprising, in combination:
 a solid state switching device having an output circuit and a control electrode, said output circuit being connected in series with said motor winding to control current flow therethrough;
 circuit means for supplying a bias current to said motor winding; said bias current when supplied said motoring winding while said motor is rotating producing a cyclically time varying voltage signal across said motor winding;
 circuit means for detecting a point in said voltage signal, said point corresponding to a predetermined point in the variation of the inductance of the magnetic circuit of said motor winding; and
 circuit means, coupled to said control electrode of said switching device, for changing the state of conductivity of said switching device output circuit upon the detection of said point in said voltage signal.

6. A control circuit according to claim 5 wherein said circuit means for supplying a bias current to said motor winding comprises a resistor connected in parallel with said switching device output circuit.

7. A control circuit according to claim 5 wherein said circuit means for changing the state of conductivity of said switching device output circuit includes means for controlling the length of time that said switching device output circuit retains the state of conductivity to which it is changed upon the detection of said point in said voltage signal.

8. A control circuit according to claim 7 wherein said time controlling circuit means comprises a comparator and a timing circuit including a timing capacitor, said comparator having a first input adapted to be supplied with a reference potential and a second input coupled to said capacitor, the charge level on said capacitor, upon the detection of said point in said voltage signal, being varied as a function of time, said comparator changing its output voltage to terminate said retained state of conductivity when the charge on said capacitor reaches a predetermined level.

9. A circuit according to claim 7 wherein said circuit means for supplying a bias current to said motor winding comprises a resistor connected in parallel with said switching device output circuit.

10. A control circuit according to claim 8 wherein said circuit means for supplying a bias current to said motor winding comprises a resistor connected in parallel with said switching device output circuit.

11. A control circuit for a variable reluctance motor having an electrical winding, a rotor and a magnetic circuit the inductance of which varies cyclically as said rotor is rotated, said control circuit comprising, in combination:
 controllable switching means for coupling said motor winding directly across a DC source of electrical energy;
 means for sensing the EMF induced in said motor winding in the absence of current flow therethrough via said switching means; and
 means for actuating said switching means to permit current to be supplied to said motor winding through said switching means when said EMF reaches a predetermined potential.

12. A control circuit for a variable reluctance motor having an electrical winding, a rotor and a magnetic circuit the inductance of which varies cyclically as said rotor is rotated, said control circuit comprising, in combination:
 controllable switching means for coupling said motor winding directly across a DC source of electrical energy;
 means for sensing the EMF induced in said motor winding in the absence of current flow therethrough via said switching means;
 means for supplying a bias current to said motor winding when said switching means is nonconductive, said EMF induced in said motor winding prior to actuation of said switching means resulting at least in part from said bias current flowing through said motor winding; and
 means for actuating said switching means to permit current to be supplied to said motor winding through said switching means when said EMF reaches a predetermined potential.

13. A control circuit according to claim 17 wherein said predetermined EMF potential corresponds to the onset of increasing inductance in the magnetic circuit of said variable reluctance motor.

* * * * *